(12) United States Patent
Jeong et al.

(10) Patent No.: US 9,829,730 B2
(45) Date of Patent: Nov. 28, 2017

(54) OPTICAL MODULATION DEVICE AND DRIVING METHOD THEREOF

(71) Applicant: SAMSUNG DISPLAY CO., LTD., Yongin, Gyeonggi-do (KR)

(72) Inventors: Seung Jun Jeong, Gyeonggi-do (KR); Hyun Seung Seo, Gyeonggi-do (KR); Jung-Hyun Cho, Seoul (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 104 days.

(21) Appl. No.: 14/706,465

(22) Filed: May 7, 2015

(65) Prior Publication Data
US 2016/0161775 A1    Jun. 9, 2016

(30) Foreign Application Priority Data

Dec. 3, 2014   (KR) .................. 10-2014-0172361

(51) Int. Cl.
| | | |
|---|---|---|
| *G02F 1/133* | (2006.01) | |
| *G02F 1/29* | (2006.01) | |
| *G02F 1/13363* | (2006.01) | |
| G02F 1/1343 | (2006.01) | |
| G02F 1/139 | (2006.01) | |

(52) U.S. Cl.
CPC ...... *G02F 1/13306* (2013.01); *G02F 1/13363* (2013.01); *G02F 1/29* (2013.01); *G02F 1/1393* (2013.01); *G02F 1/134363* (2013.01); *G02F 2001/133631* (2013.01); *G02F 2001/294* (2013.01); *G02F 2203/62* (2013.01)

(58) Field of Classification Search
CPC .... G02F 1/13306; G02F 1/13363; G02F 1/29; G02F 1/134363; G02F 1/1393; G02F 2001/133631; G02F 2001/294; G02F 2203/62
USPC .......................... 345/87–104, 204
See application file for complete search history.

(56) References Cited

U.S. PATENT DOCUMENTS

| | | |
|---|---|---|
| 7,872,694 B2 | 1/2011 | Im |
| 8,305,550 B2 | 11/2012 | Jung et al. |
| 8,305,551 B2 | 11/2012 | Son |
| 8,531,646 B2 | 9/2013 | Shi et al. |

(Continued)

FOREIGN PATENT DOCUMENTS

| | | |
|---|---|---|
| JP | 2003091013 | 3/2003 |
| KR | 1020090004006 | 1/2009 |

*Primary Examiner* — Stephen Sherman
(74) *Attorney, Agent, or Firm* — F. Chau & Associates, LLC

(57) ABSTRACT

Provided are an optical modulation device and a driving method thereof. The optical modulation device includes an active area and a peripheral area disposed around the active area. A plurality of lower electrodes is disposed in the active area. The plurality of lower electrodes extends in a first direction. The plurality of lower electrodes includes a first lower electrode and a second lower electrode. A driver is configured to apply a driving signal to the first lower electrode and the second lower electrode. The driver includes a first channel connected with an upper end of the first lower electrode, a second channel connected with a lower end of the first lower electrode, a third channel connected with an upper end of the second lower electrode, and a fourth channel connected with a lower end of the second lower electrode.

12 Claims, 13 Drawing Sheets

(56) References Cited

U.S. PATENT DOCUMENTS

2009/0015737 A1* 1/2009 Jung .................. G02B 27/2214
                                                        349/15

* cited by examiner

OPTICAL MODULATION DEVICE AND DRIVING METHOD THEREOF

CROSS-REFERENCE TO RELATED APPLICATION

This application claims priority under 35 U.S.C. §119 to Korean Patent Application No. 10-2014-0172361 filed in the Korean Intellectual Property Office on Dec. 3, 2014, the disclosure of which is incorporated by reference herein in its entirety.

TECHNICAL FIELD

Exemplary embodiments of the present invention relate to an optical modulation device and more particularly to a driving method for the optical modulation device.

DISCUSSION OF RELATED ART

Optical devices may include an optical modulation device that modulates a characteristic of light. For example, an optical display device may display a 3D image. An optical modulation device for dividing and transmitting an image at different viewpoints may display a 3D image. An optical modulation device may be used in an autostereoscopic 3D image display device, and may include a lens and a prism, which may change a path of light of an image in the display device to transmit the light to a desired viewpoint.

A direction of light may be changed by diffraction of the light through phase modulation of the light.

When polarized light passes through the optical modulation device such as a phase retarder, a polarization state may be changed. For example, when circularly polarized light is transmitted through a half-wavelength plate, a rotational direction of the circularly polarized light may be reversed. For example, when left circularly polarized light passes through the half-wavelength plate, right circularly polarized light may be emitted. The phase of the emitted circularly polarized light may vary according to an angle of an optical axis of the half-wavelength plate, for example, a slow axis. When the optical axis of the half-wavelength plate rotates by φ in-plane, the phase of the output light may be changed by 2φ. Accordingly, when the optical axis of the half-wavelength plate rotates by 180° (π radian) in an x-axial direction, the emitted light may have a phase modulation or a phase change of 360° (2π radian) in the x-axial direction. When the optical modulation device causes the phase change of 0 to 2π according to a position, a diffraction grid or a prism may be used in which the direction of the passed light may be changed or bent.

The optical axis may be controlled according to a position of the optical modulation device such as the half-wavelength plate by using a liquid crystal. In the optical modulation device which includes the phase retarder using the liquid crystal, long axes of liquid crystal molecules aligned by applying an electric field in a liquid crystal layer may rotate and may cause different phase modulation according to a position of the optical modulation device. The phase of the light emitted by passing through the optical modulation device may be determined according to a direction of a long axis of the liquid crystal, for example, an azimuthal angle.

SUMMARY

A continuous phase modulation device including an optical modulation device including liquid crystals may function as a prism, a diffraction lattice and a lens. The liquid crystal molecules may be aligned so that long axes of the liquid crystal molecules are continuously changed. For example, an optical axis of a half-wavelength plate may be changed from 0 to π so as to have a phase profile in which emitted light is changed from 0 to 2π. An aligning process including different directions according to positions of the substrate adjacent to the liquid crystal layer may be relatively complicated. When the aligning process includes minutely divided regions, it may be difficult to uniformly perform the aligning process such as a rubbing process. When the aligning process is used in the display device, display defects may occur.

Exemplary embodiments of the present invention provide an optical modulation device including liquid crystals for modulating an optical phase of light by adjusting an in-plane rotational angle of the liquid crystal molecules due to an aligning process. Various diffraction angles of light may be formed by controlling the rotational direction of the liquid crystal molecules.

Exemplary embodiments of the present invention provide an optical modulation device including liquid crystals which may simplify a manufacturing process, reduce manufacturing time, and may reduce or eliminate defects due to the pretilt distribution of liquid crystal molecules.

Exemplary embodiments of the present invention provide an optical modulation device including liquid crystals, which may reduce or eliminate an occurrence of a texture in the liquid crystal molecules by reinforcing a control force for the liquid crystal molecules and enhancing diffraction efficiency.

The optical modulation device including the liquid crystals may be relatively large and may function as a lens, a diffraction grid, and a prism and may be used in various optical devices such as a 3D image display device.

An exemplary embodiment of the present invention provides an optical modulation device including an active area and a peripheral area disposed around the active area. A plurality of lower electrodes is disposed in the active area. The plurality of lower electrodes extends in a first direction. The plurality of lower electrodes includes a first lower electrode and a second lower electrode. A driver is configured to apply a driving signal to the first lower electrode and the second lower electrode. The driver includes a first channel connected with an upper end of the first lower electrode, a second channel connected with a lower end of the first lower electrode, a third channel connected with an upper end of the second lower electrode, and a fourth channel connected with a lower end of the second lower electrode.

The optical modulation device may include a first voltage transfer line connecting the driver and the upper end of the first lower electrode. The optical modulation device may include a second voltage transfer line connecting the driver and the lower end of the first lower electrode, a third voltage transfer line connecting the driver and the upper end of the second lower electrode, and a fourth voltage transfer line connecting the driver and the lower end of the second lower electrode.

The first to fourth voltage transfer lines may be disposed in the peripheral area. The first to fourth voltage transfer lines may extend in a second direction crossing the first direction.

The peripheral area may include an upper peripheral area and a lower peripheral area disposed on opposite sides of the active area. The first and third voltage transfer lines may be disposed in the upper peripheral area. The second and fourth voltage transfer lines may be disposed in the lower peripheral area.

The optical modulation device may include a first insulating layer disposed between each of the first to fourth voltage transfer lines and between the first and second lower electrodes. The first insulating layer may include a plurality of contact holes exposing each of the first to fourth voltage transfer lines, respectively. The first and second lower electrodes may be electrically connected with the first to fourth voltage transfer lines through the contact holes.

The optical modulation device may include an upper electrode facing the first and second lower electrodes. A liquid crystal layer may be disposed between the first and second lower electrodes and the upper electrode.

The liquid crystal layer may include a plurality of liquid crystal molecules which are aligned to be substantially vertical with respect to a surface of the first and second lower electrodes or the upper electrode.

The driver may be configured to apply a driving signal that is gradually decreased or gradually increased in the order of a voltage applied to the upper end of the first lower electrode, a voltage applied to the lower end of the first lower electrode, a voltage applied to the lower end of the second lower electrode, and a voltage applied to the upper end of the second lower electrode.

The optical modulation device may include a plurality of unit regions disposed in a second direction crossing the first direction. Each unit region may include at least one the lower electrodes.

The optical modulation device may include an upper electrode facing the first and second lower electrodes. A liquid crystal layer may be disposed between the first and second lower electrodes and the upper electrode. The liquid crystal layer may include a plurality of liquid crystal molecules which are aligned to be substantially vertical with respect to a surface of the first and second lower electrodes or the upper electrode.

The driver may be configured to apply a driving signal that is gradually decreased or gradually increased in the order of a voltage applied to the lower end of the first lower electrode, a voltage applied to the upper end of the first lower electrode, a voltage applied to the upper end of the second lower electrode, and a voltage applied to the lower end of the second lower electrode.

The optical modulation device may include a plurality of unit regions disposed in a second direction crossing the first direction. Each unit region of the plurality of unit regions may include at least one of the lower electrodes.

The optical modulation device may include an upper electrode facing the first and second lower electrodes. A liquid crystal layer may be disposed between the first and second lower electrodes and the upper electrode. The liquid crystal layer may include a plurality of liquid crystal molecules which are aligned to be substantially vertical with respect to a surface of the first and second lower electrodes or the upper electrode.

A driving method of an optical modulation device according to an exemplary embodiment of the present invention includes applying a voltage to an upper end of a first lower electrode extending in a first direction through a first channel by the driver. The driving method includes applying a voltage to a lower end of the first lower electrode through a second channel by the driver. A voltage is applied to an upper end of the second lower electrode extending in the first direction through a third channel by the driver. A voltage is applied to a lower end of the second lower electrode through a fourth channel by the driver.

The driver may apply a driving signal that is gradually decreased or gradually increased in the order of a voltage applied to the upper end of the first lower electrode, a voltage applied to the lower end of the first lower electrode, a voltage applied to the lower end of the second lower electrode, and a voltage applied to the upper end of the second lower electrode.

The driver may apply a driving signal that is gradually decreased or gradually increased in the order of a voltage applied to the lower end of the first lower electrode, a voltage applied to the upper end of the first lower electrode, a voltage applied to the upper end of the second lower electrode, and a voltage applied to the lower end of the second lower electrode.

The driving method may include reducing differences between the voltage applied to the upper end of the first lower electrode, the voltage applied to the lower end of the first lower electrode, the voltage applied to the upper end of the second lower electrode, and the voltage applied to the lower end of the second lower electrode, after applying the voltages to the upper end and the lower end of the first lower electrode and the upper end and the lower end of the second lower electrode through the first to fourth channels.

The optical modulation device may include an upper electrode facing the first and second lower electrodes, and a liquid crystal layer disposed between the first and second lower electrodes and the upper electrode. The liquid crystal layer may include a plurality of liquid crystal molecules which are aligned to be substantially vertical with respect to a surface of the first and second lower electrodes or the upper electrode. A predetermined voltage may be applied to the upper electrode by the driver.

In the optical modulation device according to an exemplary embodiment of the present invention, an optical phase of light may be adjusted by controlling a rotational angle in-plane of liquid crystal molecules according to an aligning process and various diffraction angles of light may be formed by controlling a rotational direction of the liquid crystal molecules.

A manufacturing process of the optical modulation device including the liquid crystals may be simplified and manufacturing time may be reduced. Defects due to a pretilt distribution of liquid crystal molecules may be reduced or eliminated.

An occurrence of a texture in the liquid crystal molecules may be reduced or eliminated by reinforcing a control force for the liquid crystal molecules to enhance diffraction efficiency.

The optical modulation device including the liquid crystals may be relatively large and may function as a lens, a diffraction grid, and a prism. The optical modulation device may be used in various optical devices such as a 3D image display device.

DETAILED DESCRIPTION OF THE EMBODIMENTS

Figure 1:
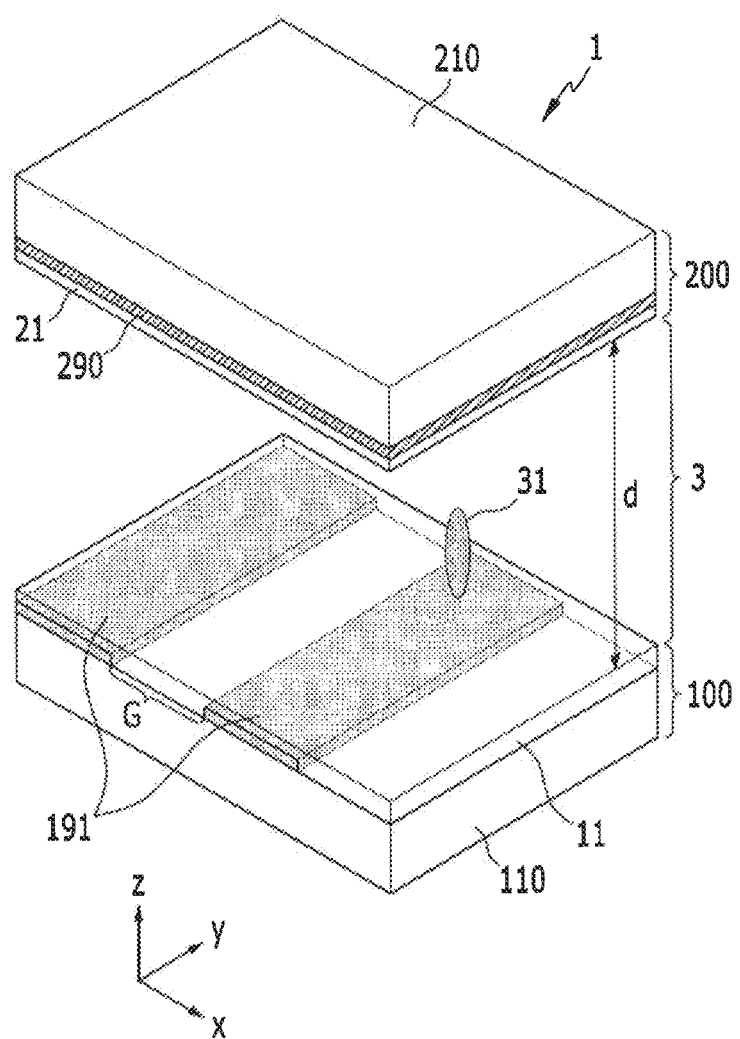
FIG. 1 is a perspective view of an optical modulation device according to an exemplary embodiment of the present invention.

Exemplary embodiments of the present invention will be described more fully hereinafter with reference to the accompanying drawings. Exemplary embodiments of the present invention may be embodied in different forms and should not be construed as limited to the exemplary embodiments set forth herein.

In the drawings, the thickness of layers, films, panels, or regions may be exaggerated for clarity. Like reference numerals may refer to like elements throughout the specification and drawings. It will be understood that when an element such as a layer, film, region, or substrate is referred to as being "on" another element, it may be directly on the other element or intervening elements may be present.

An optical modulation device according to an exemplary embodiment of the present invention will be described below in more detail with reference to FIGS. 1 to 3.

FIG. 1 is a perspective view of an optical modulation device according to an exemplary embodiment of the present invention. FIG. 2 is a layout view of an active area and a peripheral area of an optical modulation device according to an exemplary embodiment of the present invention. FIG. 3 is a cross-sectional view illustrating the optical modulation device of FIG. 2 taken along line III-III.

An optical modulation device 1 according to an exemplary embodiment of the present invention may include a first plate 100 and a second plate 200 facing the first plate 100. A liquid crystal layer 3 may be disposed between the first plate 100 and the second plate 200. Referring to FIG. 2, the optical modulation device 1 may include an active area AA which may transmit light on a planar structure and peripheral areas PAa and PAb. A light blocking member may be disposed in the peripheral areas PAa and PAb. The peripheral area PAa and the peripheral area PAb may face each other.

The first plate 100 may include a first substrate 110. The first substrate 110 may include glass or plastic. The first substrate 110 may be rigid or flexible. A surface of the first substrate 110 may be flat or at least partially bent.

A first insulating layer 140 may be disposed on the first substrate 110. The first insulating layer 140 may include an inorganic insulating material or an organic insulating material.

A plurality of voltage transfer lines 171a, 171b, 172a, and 172b may be disposed on the first insulating layer 140. The plurality of voltage transfer lines 171a, 171b, 172a, and 172b may be disposed in the peripheral areas PAa and PAb. The plurality of voltage transfer lines 171a, 171b, 172a, and 172b may include upper voltage transfer lines 171a and 171b disposed in upper peripheral area PAa, and lower voltage transfer lines 172a and 172b disposed in lower peripheral area PAb.

The plurality of voltage transfer lines 171a, 171b, 172a, and 172b may include portions extending in an x-axial direction along the periphery of the active area AA, and may be connected to a driver 700 to receive a driving signal.

The plurality of voltage transfer lines 171a, 171b, 172a, and 172b may include a conductive material such as metal such as copper (Cu) or aluminum (Al); however, exemplary embodiments of the present invention are not limited thereto.

A second insulating layer 180 may be disposed on the plurality of voltage transfer lines 171a, 171b, 172a, and 172b. The second insulating layer 180 may include an inorganic insulating material or an organic insulating material. The second insulating layer 180 may include a plurality of contact holes 185a, 185b, 186a, and 186b exposing the voltage transfer lines 171a, 171b, 172a, and 172b.

A plurality of lower electrodes 191 may be disposed on the second insulating layer 180.

The plurality of lower electrodes 191 may be disposed in the active area AA. The plurality of lower electrodes 191 may be disposed in a predetermined direction, for example, an x-axial direction in the active area AA. Each lower electrode 191 may be disposed along a vertical direction with respect to the predetermined direction, for example, a y-axial direction. Each of the plurality of lower electrodes 191 may extend substantially in parallel to each other. Opposite edges of adjacent lower electrodes 191 may extend substantially in parallel.

The lower electrodes 191 adjacent to each other in the x-axial direction may be referred to as a first lower electrode 191a and a second lower electrode 191b, respectively.

Figure 2:
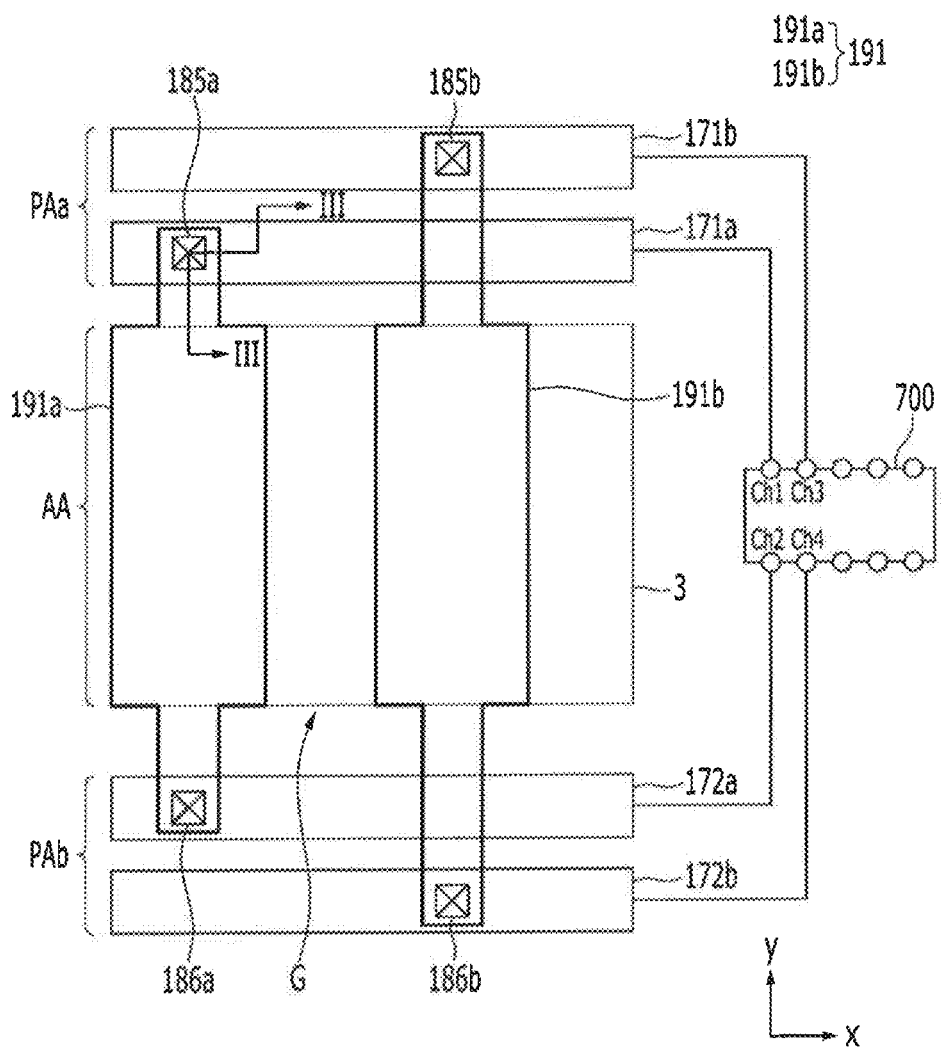
FIG. 2 is a layout view of an active area and a peripheral area of an optical modulation device according to an exemplary embodiment of the present invention.
Figure 3:
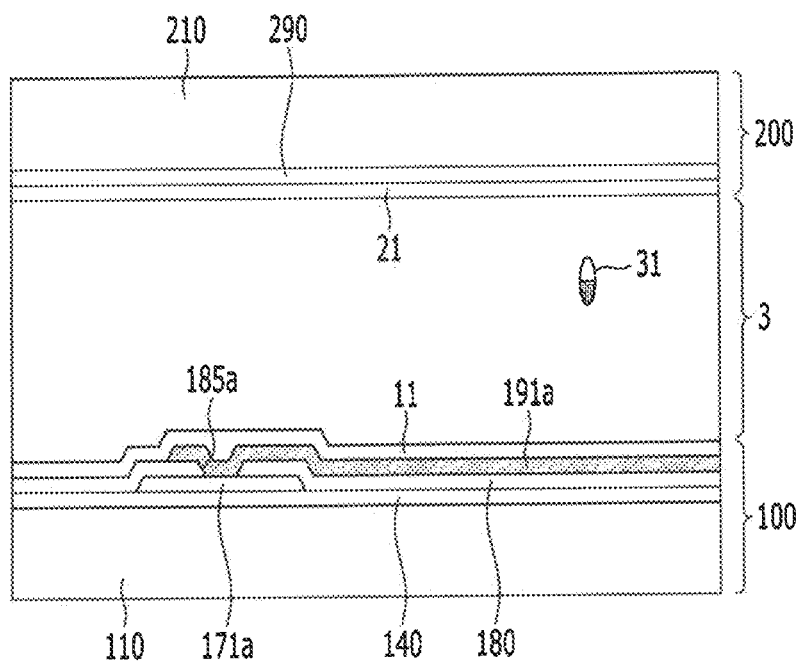
FIG. 3 is a cross-sectional view illustrating the optical modulation device of FIG. 2 taken along line III-III.

Referring to FIG. 2, each lower electrode 191 may extend to the peripheral areas PAa and PAb and may receive a voltage from the voltage transfer lines 171a, 171b, 172a, and 172b. An upper end and a lower end of the first lower electrode 191a and the second lower electrode 191b may be electrically connected with the voltage transfer lines 171a, 171b, 172a, and 172b through the contact holes 185a, 185b, 186a, and 186b of the second insulating layer 180, respectively.

The voltage transfer lines 171a and 171b and the voltage transfer lines 172a and 172b may be separate voltage transfer lines from each other. The voltage transfer lines 171a and 171b to which each upper ends of the two adjacent lower electrodes 191a and 191b may be connected may be separate voltage transfer lines from each other. The voltage transfer lines 172a and 172b to which each lower end of the two adjacent lower electrodes 191a and 191b may be connected may be separate voltage transfer lines from each other.

For example, the upper end of the first lower electrode 191a may be electrically connected with the voltage transfer line 171a disposed in the peripheral area PAa. The lower end of the first lower electrode 191a may be electrically connected with the voltage transfer line 172a disposed in the peripheral area PAb. The upper end of the second lower electrode 191b may be electrically connected with the voltage transfer line 171b disposed in the peripheral area PAa. The lower end of the second lower electrode 191b may be electrically connected with the voltage transfer line 172b disposed in the peripheral area PAb.

The plurality of voltage transfer lines 171a, 171b, 172a, and 172b may be respectively connected with different channels of the driver 700 (e.g. channels Ch1, Ch3, Ch2 and Ch4, respectively) to simultaneously transfer separate voltages to each of the different channels. Some of the voltages which are simultaneously transferred by the voltage transfer lines 171a, 171b, 172a, and 172b may be different from each other, and some voltages may be the same as each other.

When more than one first and second lower electrodes 191a and 191b illustrated in FIG. 2 are repeatedly disposed in the x-axial direction, each of the plurality of first lower electrodes 191a may be connected to the same voltage transfer lines 171a and 172a to receive the same voltage, and the plurality of second lower electrodes 191b may be connected to the same transfer lines 171b and 172b to receive the same voltage.

The plurality of lower electrodes 191 may include conductive oxide such as ITO and IZO or a transparent conductive material such as a thin metal and a metal mesh. The transparent conductive material included in the plurality of lower electrodes 191 may be determined according to targeted transmittance of the optical modulation device 1.

A width of a space G between the adjacent lower electrodes 191 may be variously controlled according to a design condition of the optical modulation device. A ratio of a width of the space G adjacent to the lower electrode 191 to the width of the lower electrode 191 may be approximately N:1 (N is a real number of 1 or more).

Positions of the plurality of voltage transfer lines 171a, 171b, 172a, and 172b and the plurality of lower electrodes 191 are not limited to those described above. For example, positions of the plurality of voltage transfer lines 171a, 171b, 172a, and 172b may be reversely changed with respect to each other or the plurality of voltage transfer lines 171a, 171b, 172a, and 172b may be disposed in other layers.

The second plate 200 may include a second substrate 210. The second substrate 210 may include glass or plastic. The second substrate 210 may be rigid or flexible. A surface of the second substrate 210 may be flat or may be partly bent.

An upper electrode 290 may be disposed on the second substrate 210. The upper electrode 290 may include conductive oxide such as ITO and IZO or a transparent conductive material such as a thin metal and a metal mesh. The transparent conductive material included in the lower electrode 191 may be determined according to targeted transmittance of the optical modulation device 1.

The upper electrode 290 may receive a predetermined voltage from a voltage applying unit. The voltage received by the upper electrode 290 may be substantially 0V. The upper electrode 290 may be disposed on the second substrate 210. The upper electrode 290 may be formed on the second substrate 210 as a single body and patterned to include a plurality of separated portions.

The liquid crystal layer 3 may include a plurality of liquid crystal molecules 31. The plurality of liquid crystal molecules 31 may have negative dielectric anisotropy. The plurality of liquid crystal molecules 31 may be aligned in a transverse direction with respect to a direction of an electric field generated in the liquid crystal layer 3. The plurality of liquid crystal molecules 31 may be substantially vertically aligned with respect to the second plate 200 and the first plate 100 when the electric field is not generated in the liquid crystal layer 3. The plurality of liquid crystal molecules 31 may include nematic liquid crystal molecules.

A height d of a cell gap of the liquid crystal layer 3 may substantially satisfy Equation 1 with respect to light having a predetermined wavelength λ. As a result, the optical modulation device 1 according to an exemplary embodiment of the present invention may substantially function as a half-wavelength plate and be used as a diffraction grid or a lens.

$$\frac{\lambda}{2} \times 1.3 \geq \Delta nd \geq \frac{\lambda}{2} \qquad \text{(Equation 1)}$$

In Equation 1, Δnd is a phase retardation value of light passing through the liquid crystal layer 3.

A first director 11 may be disposed on an inner surface of the first plate 100, and a second director 21 may be disposed on an inner surface of the second plate 200.

The first director 11 and the second director 21 may include vertical alignment layers. The vertical alignment layers might not be aligned in a predetermined direction. Accordingly, in a manufacturing process of the optical modulation device 1 according to an exemplary embodiment of the present invention, an aligning process such as a rubbing process may be omitted, and as a result, the manufacturing process may be simplified and a manufacturing time may be reduced. An occurrence of defects according to a pretilt distribution of the liquid crystal molecules 31 may be reduced or prevented. An occurrence of defects in the optical modulation device or the optical device including the same due to the alignment defects may be reduced or prevented, and as a result, a larger optical modulation device may be formed.

A driving method of the optical modulation device 1 according to an exemplary embodiment of the present invention will be described in more detail below with reference to FIGS. 4 to 8 in addition to the drawings described above.

Figure 4:
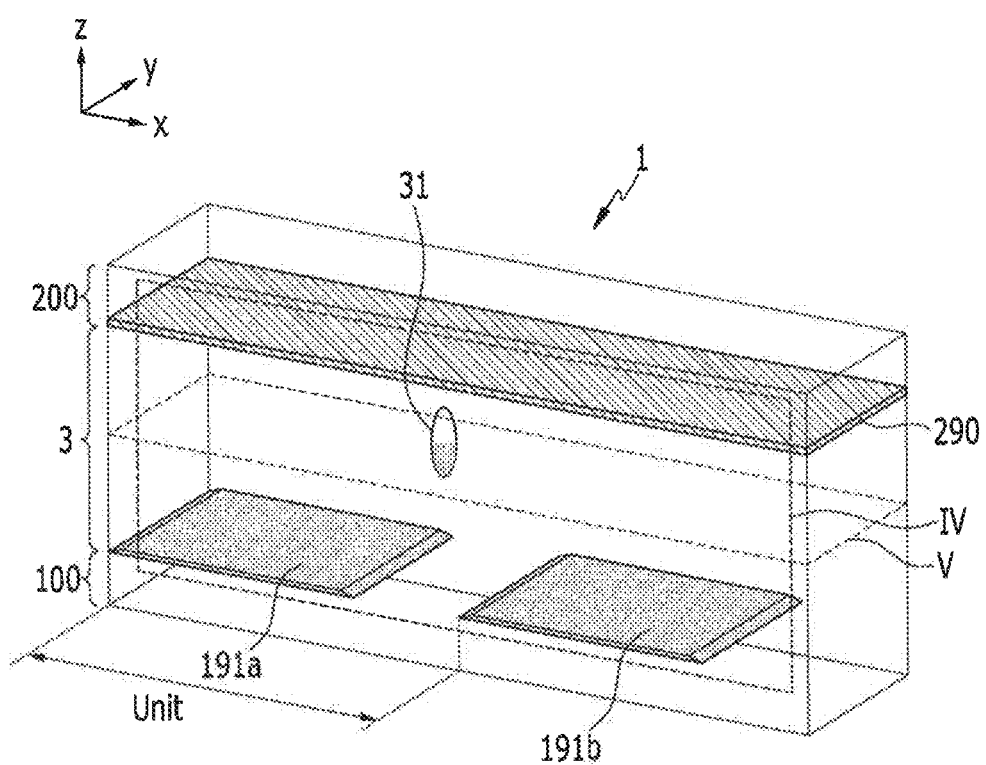
FIG. 4 is a perspective view of an optical modulation device according to an exemplary embodiment of the present invention.
Figure 5:
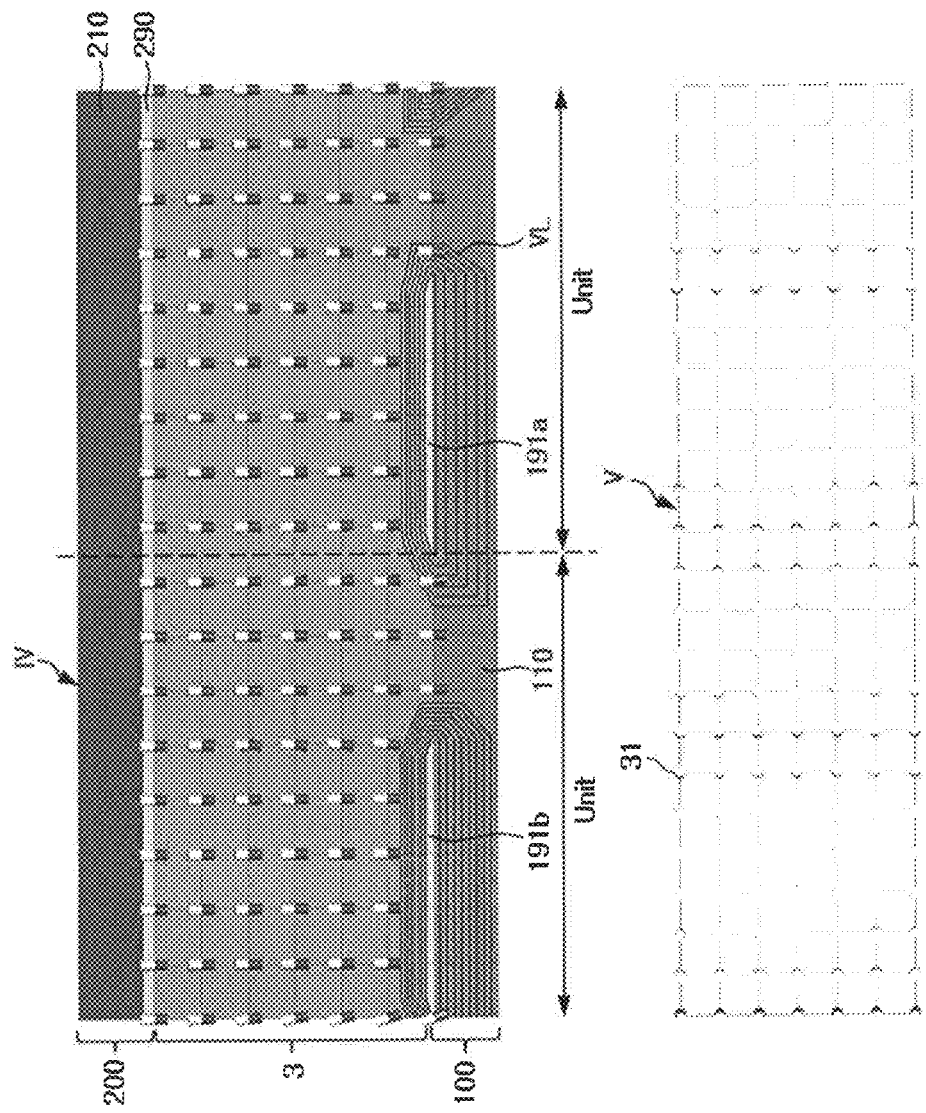
FIG. 5 is a cross-sectional view taken along line IV of FIG. 4 and a cross-sectional view taken along line V of FIG. 4 illustrating alignment of liquid crystal molecules before a voltage difference is applied to a first plate and a second plate of an optical modulation device according to an exemplary embodiment of the present invention.
Figure 6:
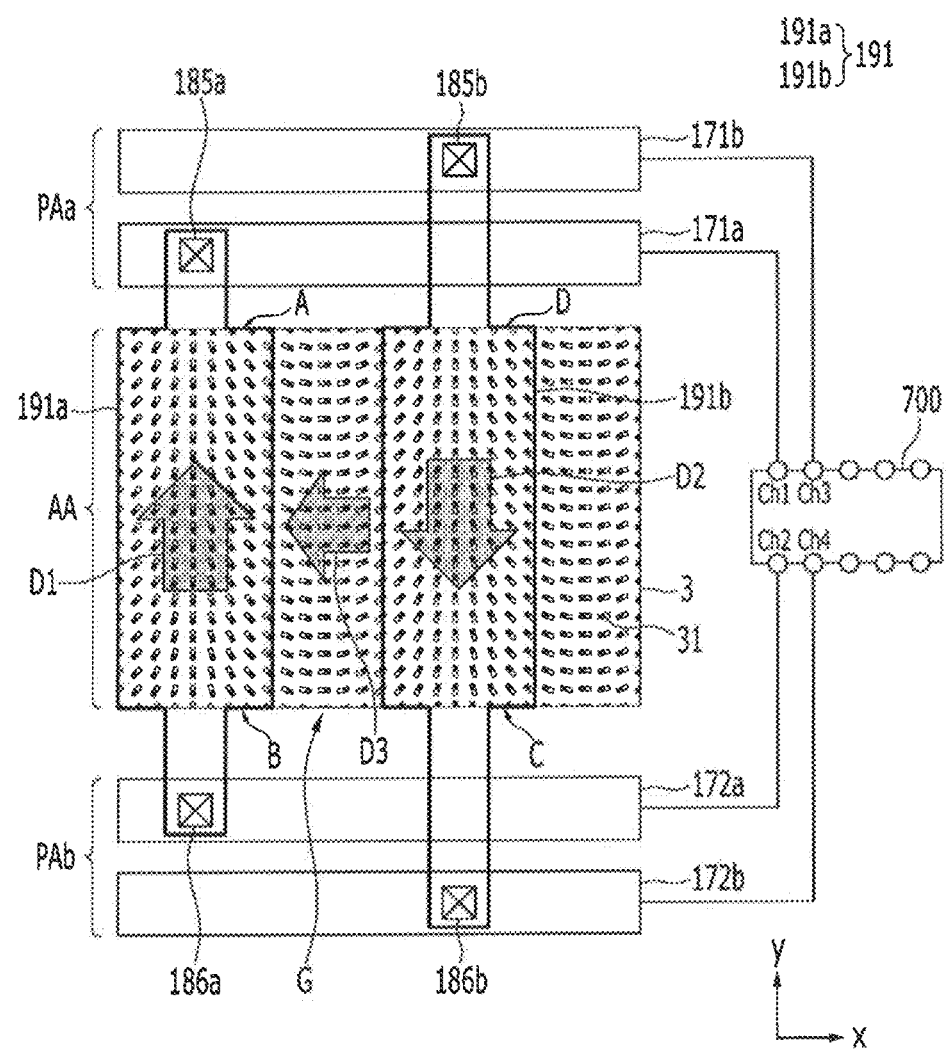
FIG. 6 is a layout view for an active area and a peripheral area of an optical modulation device according to an exemplary embodiment of the present invention.
Figure 7:
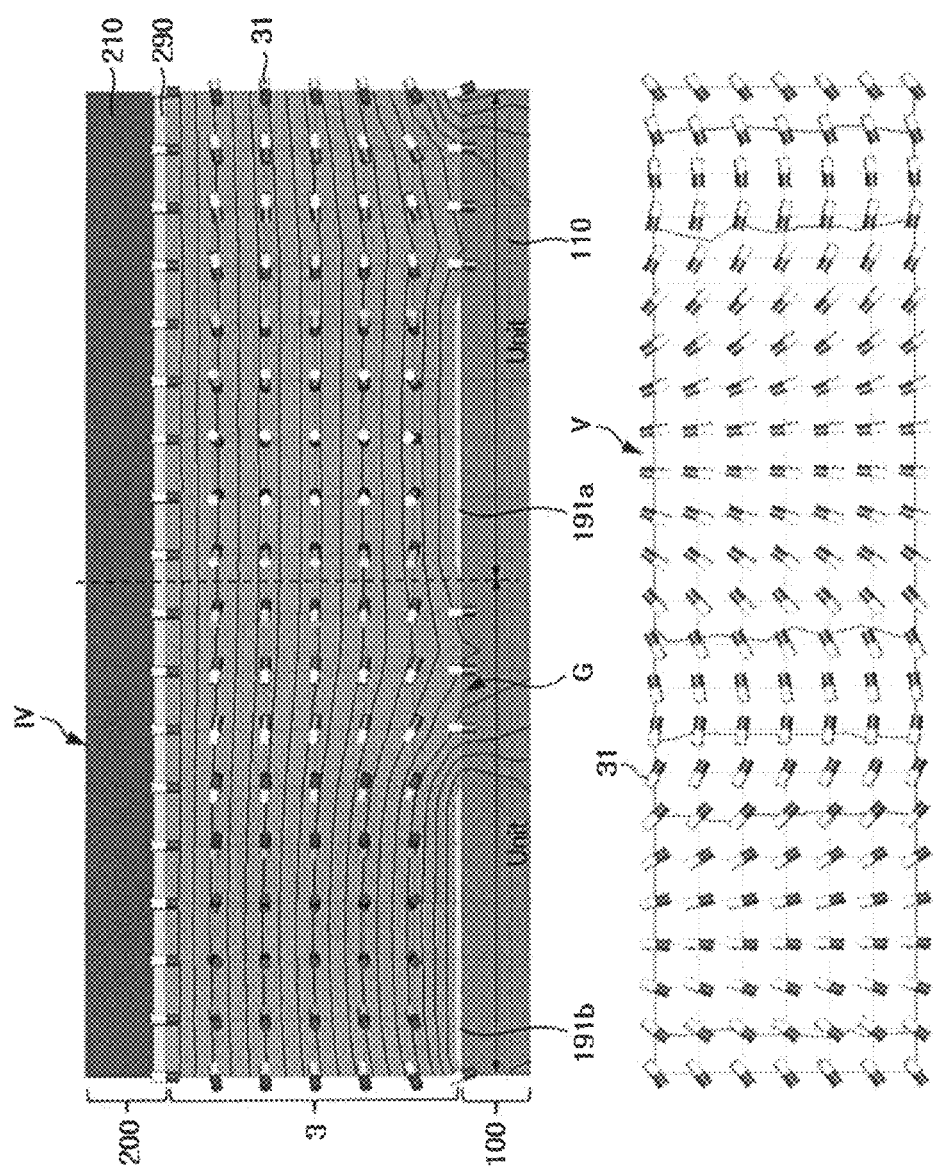
FIG. 7 is a cross-sectional view taken along line IV of FIG. 4 and a cross-sectional view taken along line V of FIG. 4 illustrating alignment of liquid crystal molecules stabilized after applying a driving signal according to a driving method according to an exemplary embodiment of the present invention in the optical modulation device according to an exemplary embodiment of the present invention.
Figure 8:
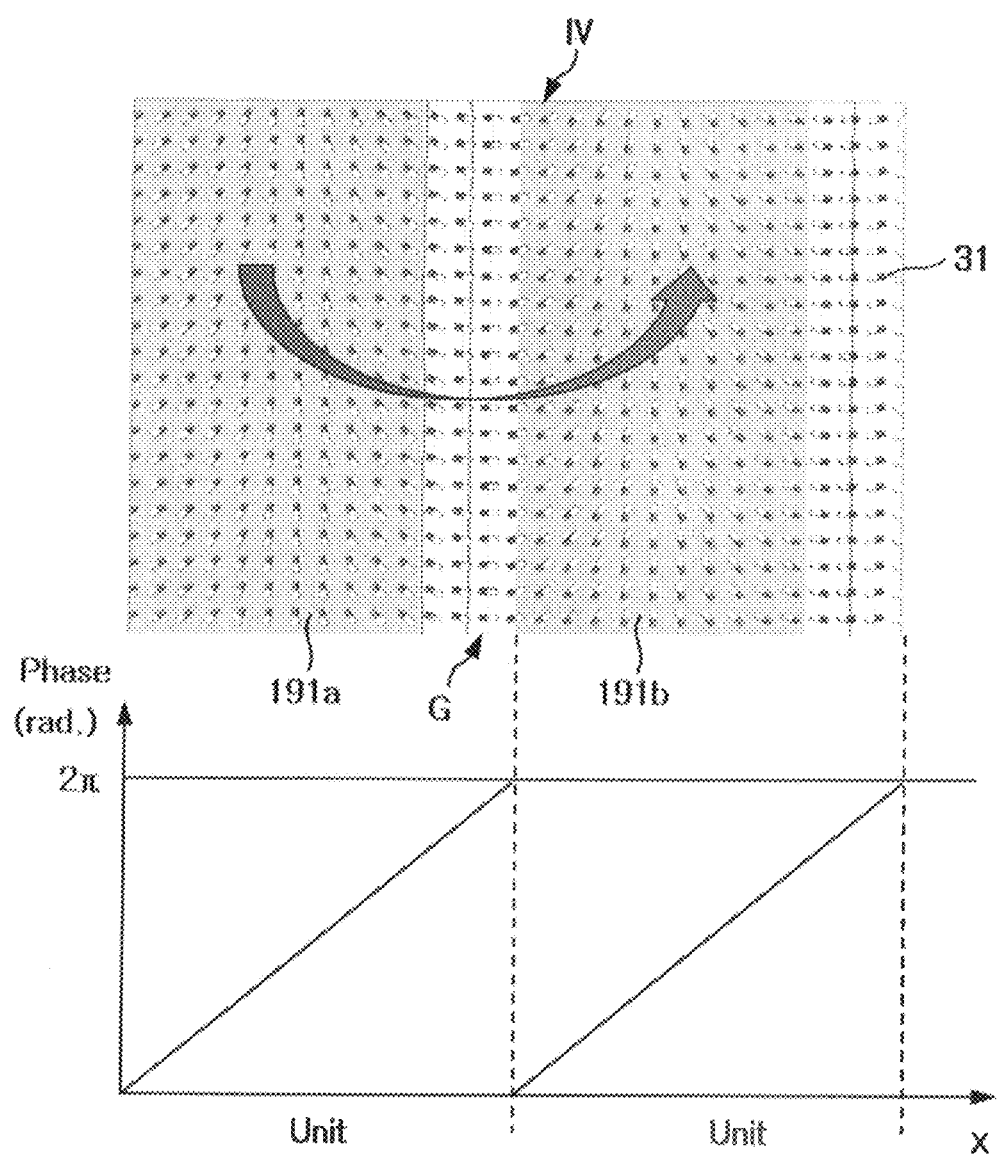
FIG. 8 is a cross-sectional view taken along line V of FIG. 4 illustrating alignment of liquid crystal molecules stabilized after applying a driving signal according to a driving method according to an exemplary embodiment of the present invention in the optical modulation device according to an exemplary embodiment of the present invention, and a graph illustrating a phase change according to the alignment of the liquid crystal molecules.

FIG. 4 is a perspective view of the optical modulation device according to an exemplary embodiment of the present invention. FIG. 5 is a cross-sectional view taken along line IV of FIG. 4 and a cross-sectional view taken along line V of FIG. 4 illustrating alignment of liquid crystal molecules before a voltage difference is applied to a first plate and a second plate of the optical modulation device according to an exemplary embodiment of the present invention. FIG. 6 is a layout view for an active area and a peripheral area of the optical modulation device according to an exemplary embodiment of the present invention. FIG. 7 is a cross-sectional view taken along line IV of FIG. 4 and a cross-sectional view taken along line V of FIG. 4 illustrating alignment of liquid crystal molecules stabilized after applying a driving signal according to a driving method according to an exemplary embodiment of the present invention in the optical modulation device according to an exemplary embodiment of the present invention. FIG. 8 is a cross-sectional view taken along line V of FIG. 4 illustrating alignment of liquid crystal molecules stabilized after applying a driving signal according to a driving method according to an exemplary embodiment of the present invention in the optical modulation device according to an exemplary embodiment of the present invention, and a graph illustrating a phase change according to the alignment of the liquid crystal molecules.

FIG. 4 illustrates the optical modulation device 1 including a liquid crystal according to an exemplary embodiment of the present invention. The optical modulation device 1 may include a plurality of unit regions, which may also be referred to as a unit. Each unit region may include at least one of the lower electrodes 191a and 191b. According to an exemplary embodiment of the present invention, each unit region may include one lower electrode 191a or 191b.

Referring to FIG. 5, when voltages are not applied to the first and second lower electrodes 191a and 191b and the upper electrode 290, the liquid crystal molecules 31 may be initially aligned in a substantially vertical direction with respect to planes of the first plate 100 and the second plate 200. An equipotential line VL is illustrated on the liquid crystal layer 3. Voltages of 0V may be applied to the first and second lower electrodes 191a and 191b based on the voltage of the upper electrode 290. A voltage of a threshold voltage Vth or less at which the alignment of the liquid crystal molecules 31 starts to be changed may be applied to the first and second lower electrodes 191a and 191b.

Referring to FIG. 6, the driver 700 may apply separate voltages to an upper end A of the first lower electrode 191a, a lower end B of the first lower electrode 191a, a lower end C of the second lower electrode 191b, and an upper end D of the second lower electrode 191b through the voltage transfer lines 171a, 172a, 172b and 171b, respectively. The voltages applied through the voltage transfer lines 171a, 171b, 172a, and 172b may have the same polarity based on the voltage applied to the upper electrode 290. The polarity of the voltages applied by the voltage transfer lines 171a, 171b, 172a, and 172b may be inverted on a cycle of at least one frame. According to an exemplary embodiment of the present invention, the voltages applied through the voltage transfer lines 171a, 171b, 172a, and 172b have a positive polarity based on the voltage applied to the upper electrode 290.

According to an exemplary embodiment of the present invention, gradually lowered voltages may be applied in the order of the upper end A of the first lower electrode 191a, the lower end B of the first lower electrode 191a, the lower end C of the second lower electrode 191b, and the upper end D of the second lower electrode 191b. That is, the voltage applied to the upper end A of the first lower electrode 191a may be higher than the voltage applied to the lower end B of the first lower electrode 191a, which may be higher than the voltage applied to the lower end C of the second lower electrode 191b, which may be higher than the voltage applied to the upper end D of the second lower electrode 191b. When the polarities of the voltages transferred by the voltage transfer lines 171a, 171b, 172a, and 172b have negative polarities, the voltage applied to the upper end A of the first lower electrode 191a may be lower than the voltage applied to the lower end B of the first lower electrode 191a, which may be lower than the voltage applied to the lower end C of the second lower electrode 191b, which may be lower than the voltage applied to the upper end D of the second lower electrode 191b.

The voltages applied to the first and second lower electrodes 191a and 191b may be substantially and monotonically decreased toward the lower end B from the upper end A due to self-resistance of the first lower electrode 191a between the upper end A of the first lower electrode 191a and the lower end B of the first lower electrode 191a. The voltages applied to the first and second lower electrodes 191a and 191b may be substantially and monotonically increased toward the lower end C from the upper end D due to self-resistance of the second lower electrode 191b between the upper end D of the second lower electrode 191b and the lower end C of the second lower electrode 191b.

The driver 700 may apply a predetermined voltage such as 0V to the upper electrode 290.

The electric field may be generated in the liquid crystal layer 3 according to the voltages applied to the first and second lower electrodes 191a and 191b and the voltage of the upper electrode 290. The liquid crystal molecules 31 may be tilted in a substantially vertical direction with respect to the electric field.

As a result, as illustrated in FIGS. 7 and 8, most of the liquid crystal molecules 31 may be tilted substantially in parallel to the surface of the first plate 100 or the second plate 200 to form in-plane alignment, and long axes of the liquid crystal molecules 31 may rotate in-plane to form a spiral alignment.

The liquid crystal molecules 31 on the first lower electrode 191a may be controlled to fall toward the upper end A of the first lower electrode 191a along an arrow direction D1 illustrated in FIG. 6. The liquid crystal molecules 31 on the second lower electrode 191b may be controlled to fall toward the lower end C of the second lower electrode 191b along an arrow direction D2 illustrated in FIG. 6.

Since the voltage applied to the first lower electrode 191a may be larger than the voltage applied to the second lower electrode 191b, the liquid crystal molecules 31 positioned in the space G between the first lower electrode 191a and the second lower electrode 191b may be controlled to fall toward the first lower electrode 191a along an arrow direction D3 illustrated in FIG. 6.

As a result, as illustrated in FIGS. 7 and 8, the liquid crystal molecules 31 may form the spiral alignment, or may form a U-shaped alignment. In the liquid crystal molecules 31, azimuthal angles of the long axes of the liquid crystal molecules 31 may be changed from approximately 0° to approximately 180° on a cycle of a pitch of the lower electrode 191. A portion where the azimuthal angles of the long axes of the liquid crystal molecules 31 are changed from approximately 0° to approximately 180° in an x-axial direction may form one U-shaped alignment. A portion where the azimuthal angles of the long axes of the liquid crystal molecules 31 are changed from approximately 0° to approximately 180° in an x-axial direction may be referred to as a unit region. According to an exemplary embodiment of the present invention, one unit region may include the space G between the first lower electrode 191a and the second lower electrode 191b adjacent to the first lower electrode 191a.

After voltages are applied to the upper end A and the lower end B of the first lower electrode 191a and the lower end C and the upper end D of the second lower electrode 191b, a difference between the voltages applied to the upper end A and the lower end B of the first lower electrode 191a and the lower end C and the upper end D of the second lower electrode 191b may be reduced so that a phase retardation value in a z-axial direction of the entire optical modulation device 1 becomes approximately π.

When the optical modulation device 1 operates as the half-wavelength plate and satisfies Equation 1, a rotational direction of circularly polarized light transmitted through the optical modulation device may be reversed. FIG. 8 illustrates a phase change according to a position in the x-axial direction when right circularly polarized light is transmitted through the optical modulation device 1. The right circularly polarized light passing through the optical modulation device 1 may be changed to left circularly polarized light. Since the phase retardation value of the liquid crystal layer 3 may vary in the x-axial direction, the phase of the circularly polarized light transmitted through the optical modulation device 1 may be continuously changed.

Generally, when an optical axis of the half-wavelength plate rotates by φ in-plane, the phase of light transmitted through the half-wavelength plate may be changed by 2φ, and as a result, the phase of the light emitted from one unit region in which the azimuthal angle of the long axes of the liquid crystal molecules 31 is changed to 180° may be changed from 0 to 2π (radian) in the x-axial direction. This may be referred to as a forward phase slope. This phase change may occur in every unit region. The forward phase slope portion of the lens changing the direction of light may be performed by the optical modulation device 1.

A driving method of the optical modulation device 1 according to an exemplary embodiment of the present invention will be described in more detail below with reference to FIGS. 9 and 10 in addition to the drawings described above.

Figure 9:
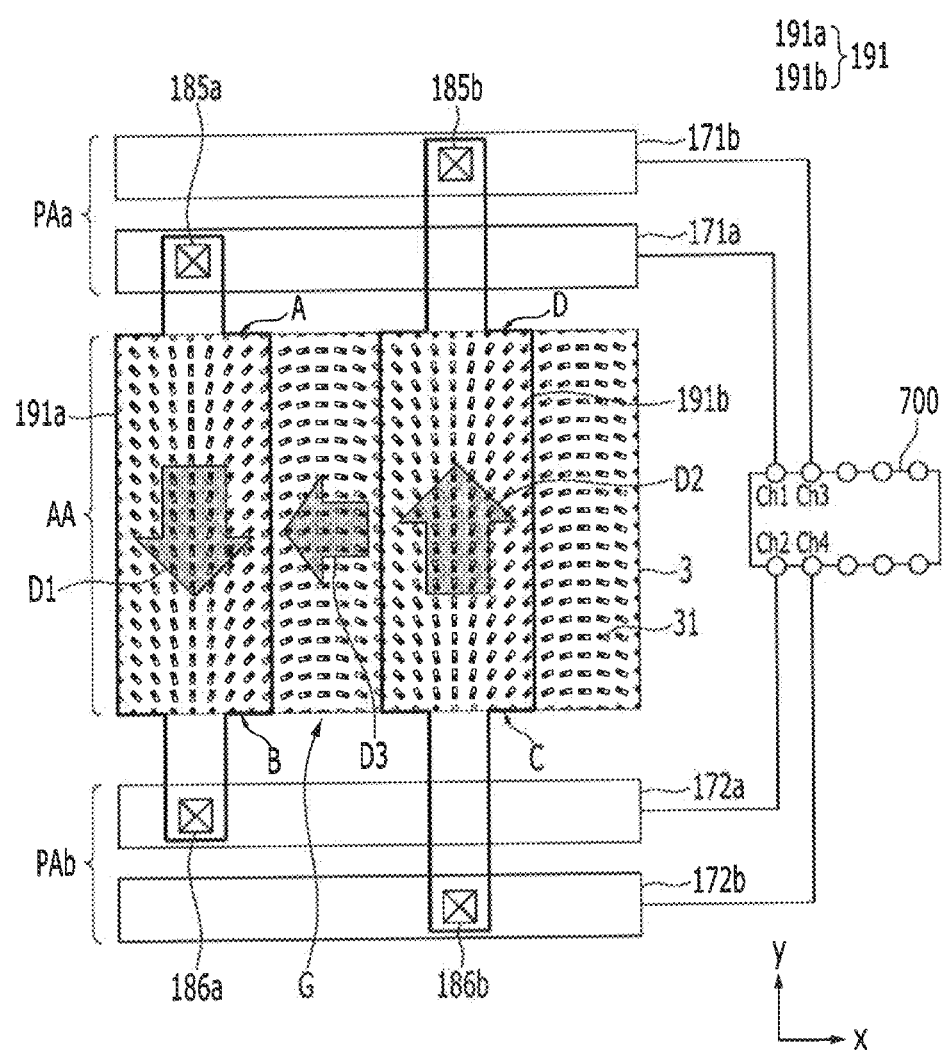
FIG. 9 is a layout view for an active area and a peripheral area of an optical modulation device according to an exemplary embodiment of the present invention.

FIG. 9 is a layout view for an active area and a peripheral area of the optical modulation device according to an exemplary embodiment of the present invention. FIG. 10 is a cross-sectional view taken along line V of FIG. 4 illustrating alignment of liquid crystal molecules stabilized after applying a driving signal according to a driving method according to an exemplary embodiment of the present invention in the optical modulation device according to an exemplary embodiment of the present invention, and a graph illustrating a phase change according to the alignment of the liquid crystal molecules.

Referring to FIG. 9, the driver 700 may apply separate voltages to an upper end A of the first lower electrode 191a, a lower end B of the first lower electrode 191a, a lower end C of the second lower electrode 191b, and an upper end D of the second lower electrode 191b through the voltage transfer lines 171a, 172a, 172b, and 171b, respectively. The voltages applied through the voltage transfer lines 171a, 171b, 172a, and 172b may have the same polarity based on the voltage applied to the upper electrode 290. The polarity of the voltages applied by the voltage transfer lines 171a, 171b, 172a, and 172b may be inverted on a cycle of at least one frame. According to an exemplary embodiment of the present invention, the voltages transferred through the voltage transfer lines 171a, 171b, 172a, and 172b may have a positive polarity based on the voltage applied to the upper electrode 290.

According to an exemplary embodiment of the present invention, gradually lowered voltages may be applied in the order of the lower end B of the first lower electrode 191a, the upper end A of the first lower electrode 191a, the upper end D of the second lower electrode 191b, and the lower end C of the second lower electrode 191b. That is, the voltage applied to the lower end B of the first lower electrode 191a may be higher than the voltage applied to the upper end A of the first lower electrode 191a, which may be higher than the voltage applied to the upper end D of the second lower electrode 191b, which may be higher than and the voltage applied to the lower end C of the second lower electrode 191b. When the polarities of the voltages applied by the voltage transfer lines 171a, 171b, 172a, and 172b are negative, the voltages applied to the lower end B of the first lower electrode 191a may be lower than the voltage applied to the upper end A of the first lower electrode 191a, which may be lower than the voltage applied to the upper end D of the second lower electrode 191b, which may be lower than the voltage applied to the lower end C of the second lower electrode 191b.

The voltages may be substantially and monotonically increased toward the lower end B from the upper end A due to self-resistance of the first lower electrode 191a between the upper end A of the first lower electrode 191a and the lower end B of the first lower electrode 191a. The voltages may be substantially and monotonically decreased toward the lower end C from the upper end D due to self-resistance of the second lower electrode 191b between the upper end D of the second lower electrode 191b and the lower end C of the second lower electrode 191b.

The driver 700 may apply a predetermined voltage such as 0V to the upper electrode 290.

The electric field may be generated in the liquid crystal layer 3 according to the voltages applied to the lower electrodes 191a and 191b and the voltage applied to the upper electrode 290. The plurality of liquid crystal molecules 31 may be tilted in a substantially vertical direction with respect to the electric field.

Figure 10:
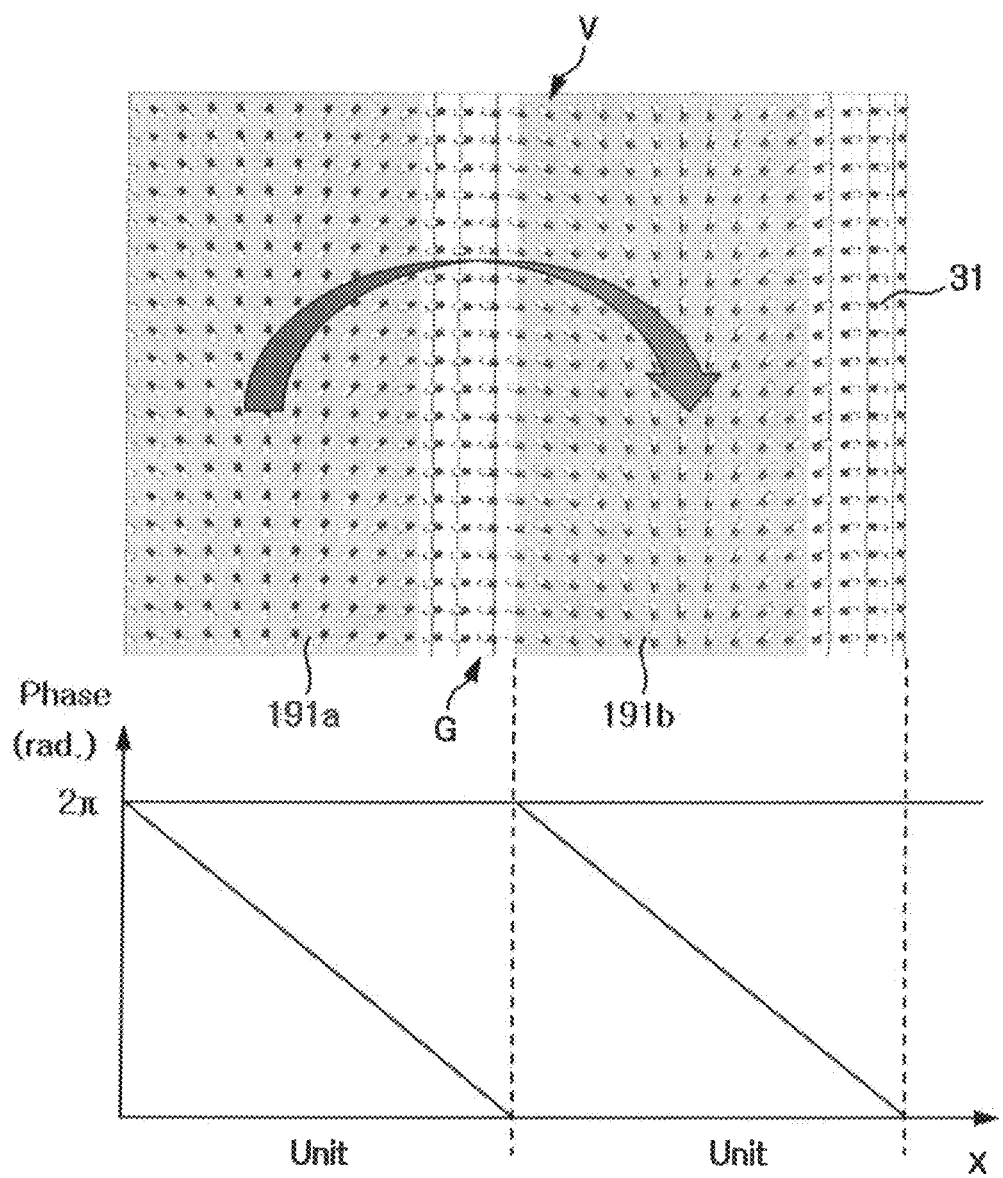
FIG. 10 is a cross-sectional view taken along line V of FIG. 4 illustrating alignment of liquid crystal molecules stabilized after applying a driving signal according to a driving method according to an exemplary embodiment of the present invention in the optical modulation device according to an exemplary embodiment of the present invention, and a graph illustrating a phase change according to the alignment of the liquid crystal molecules.

As illustrated in FIGS. 9 and 10, most of the liquid crystal molecules 31 may be tilted substantially in parallel with respect to the surface of the first plate 100 or the second plate 200 to form in-plane alignment. Long axes of most of the liquid crystal molecules 31 may be rotated in-plane to form the spiral alignment.

The liquid crystal molecules 31 on the first lower electrode 191a may be controlled to fall toward the lower end B of the first lower electrode 191a along an arrow direction D1 illustrated in FIG. 9. The liquid crystal molecules 31 on the second lower electrode 191b may be controlled to fall toward the upper end D of the second lower electrode 191b along an arrow direction D2 illustrated in FIG. 9.

Since the voltage applied to the first lower electrode 191a may be higher than the voltage applied to the second lower electrode 191b, the liquid crystal molecules 31 disposed in the space G between the first lower electrode 191a and the second lower electrode 191b may be controlled to fall toward the first lower electrode 191a along an arrow direction D3 illustrated in FIG. 9.

As illustrated in FIGS. 9 and 10, the plurality of liquid crystal molecules 31 may form the spiral alignment, or may form an N-shaped alignment. In the plurality of liquid crystal molecules 31, azimuthal angles of the long axes of the plurality of liquid crystal molecules 31 may be changed from approximately 180° to approximately 0° on a cycle of a pitch of the lower electrode 191. A portion where the azimuthal angles of the long axes of the plurality of liquid crystal molecules 31 are changed from approximately 180° to approximately 0° in an x-axial direction may form one N-shaped alignment, which may be referred to as the unit region. According to an exemplary embodiment of the present invention, one unit region may include the space G between the first lower electrode 191*a* and the second lower electrode 191*b* adjacent to the first lower electrode 191*a*.

After differential voltages are applied to the upper end A and the lower end B of the first lower electrode 191*a* and the lower end C and the upper end D of the second lower electrode 191*b*, a difference between the voltages applied to the upper end A and the lower end B of the first lower electrode 191*a* and the lower end C and the upper end D of the second lower electrode 191*b* may be reduced so that a phase retardation value in a z-axial direction of the entire optical modulation device 1 becomes approximately π.

When the optical modulation device 1 operates as the half-wavelength plate and satisfies Equation 1, a rotational direction of circularly polarized light passing through the optical modulation device 1 may be reversed. FIG. 10 illustrates a phase change according to a position in the x-axial direction when right circularly polarized light is transmitted through the optical modulation device 1. The right circularly polarized light passing through the optical modulation device 1 may be changed to left circularly polarized light. Since the phase retardation value of the liquid crystal layer 3 may vary in the x-axial direction, the phase of the circularly polarized light passing through the optical modulation device 1 may be continuously changed.

Generally, when an optical axis of the half-wavelength plate rotates by $\phi$ in-plane, the phase of light transmitted through the half-wavelength plate may be changed by $2\phi$, and as a result, the phase of the light emitted from one unit region in which the azimuthal angle of the long axes of the liquid crystal molecules 31 is changed to 180° may be changed from $2\pi$ (radian) to 0 in the x-axial direction. This may be referred to as a backward phase slope. The phase change may occur in every unit region. The backward phase slope portion of the lens changing the direction of light may be performed by the optical modulation device 1.

According to an exemplary embodiment of the present invention, the in-plane rotation angle of the plurality of liquid crystal molecules 31 may be controlled according to a method of applying the driving signal to variously modulate an optical phase and form various diffraction angles of light.

According to an exemplary embodiment of the present invention, the rotational direction of the plurality of liquid crystal molecules 31 may be determined without pretilting the plurality of liquid crystal molecules 31. The plurality of liquid crystal molecules 31 between the first plate 100 and the second plate 200 may simultaneously rotate in the same direction, and as a result, control force for the liquid crystal molecules 31 may be reinforced to reduce or eliminate an occurrence of texture. Accordingly, diffraction efficiency of the optical modulation device 1 may be increased.

The optical modulation device 1 according to an exemplary embodiment of the present invention may implement various phase slopes according to a driving method of the optical modulation device 1. The optical modulation device 1 may function as a diffraction grid, a prism or a lens, which may change the direction of light by using the various phase slopes.

Figure 11:
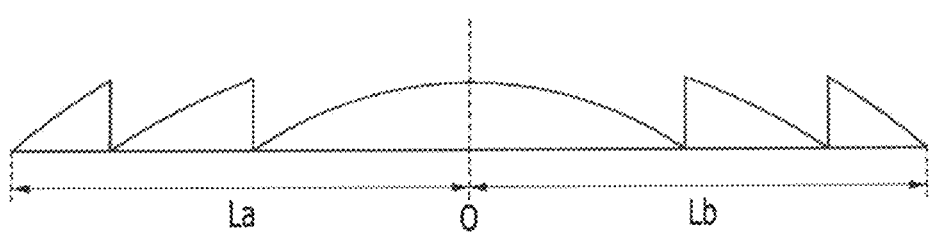
FIG. 11 illustrates a phase change according to a position of a lens including the optical modulation device according to an exemplary embodiment of the present invention.

FIG. 11 illustrates a phase change according to a position of a lens including the optical modulation device according to an exemplary embodiment of the present invention.

The optical modulation device 1 according to an exemplary embodiment of the present invention may implement both the forward phase slope and the backward phase slope by varying the method of applying the driving signal according to a position of the optical modulation device 1. The optical modulation device 1 may, therefore, operate as the lens. FIG. 11 illustrates a phase change according to a position of a Fresnel lens as an example of the lens. Thus, the optical modulation device 1 may operate as a Fresnel lens. The Fresnel lens may use an optical characteristic of a Fresnel zone plate, and since a phase distribution of 0° to 180° may be periodically repeated, effective phase retardation may be the same as or similar to that of a solid convex lens or a green lens.

As illustrated in FIG. 11, based on a center O of one Fresnel lens, a left portion La may include a plurality of forward phase slopes and a right portion Lb may include a plurality of backward phase slopes. Accordingly, a portion of the optical modulation device 1 corresponding to the left portion La of the Fresnel lens may apply the forward phase slope according to an exemplary embodiment of the present invention, for example, the exemplary embodiment of the present invention illustrated in FIGS. 4 to 8. A portion of the optical modulation device 1 corresponding to the right portion Lb of the Fresnel lens may apply the backward phase slope according to an exemplary embodiment of the present invention, for example, the exemplary embodiment of the present invention illustrated in FIGS. 9 and 10.

The plurality of forward phase slopes included in the left portion La of the Fresnel lens may have different widths according to a position of the Fresnel lens. The width of the lower electrode 191 of the optical modulation device 1 corresponding to each forward phase slope and/or the number of lower electrodes 191 included in one unit region may be adjusted according to a position of the Fresnel lens. The plurality of backward phase slopes included in the right portion Lb of the Fresnel lens may have different widths according to a position of the Fresnel lens. The width of the lower electrode 191 of the optical modulation device 1 corresponding to each backward phase slope and/or the number of lower electrodes 191 included in one unit region may be adjusted according to a position of the Fresnel lens.

The phase curvature of the Fresnel lens may be adjusted according to the voltages applied to the lower electrode 191 and the upper electrode 290.

Figure 12:
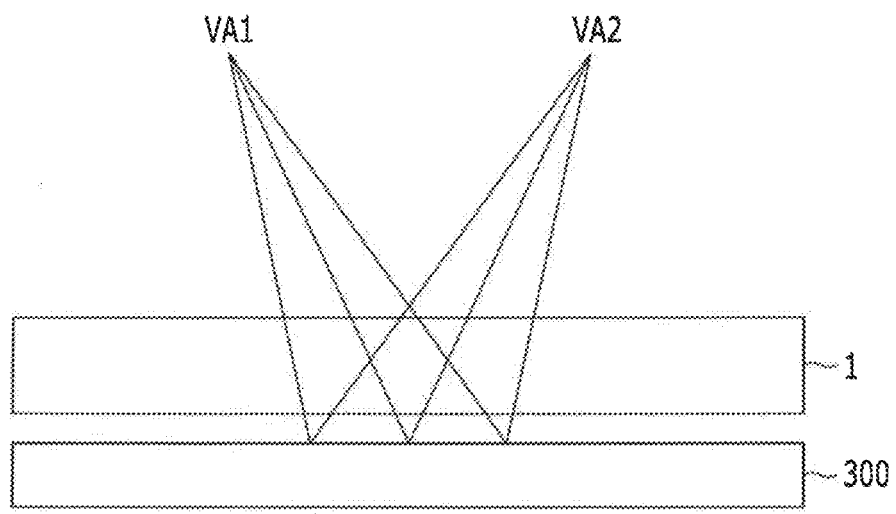
FIGS. 12 and 13 are diagrams illustrating a schematic structure of a 3D image display device including an optical modulation device according to an exemplary embodiment of the present invention and a method of displaying a 2D image and a 3D image, respectively.
Figure 13:
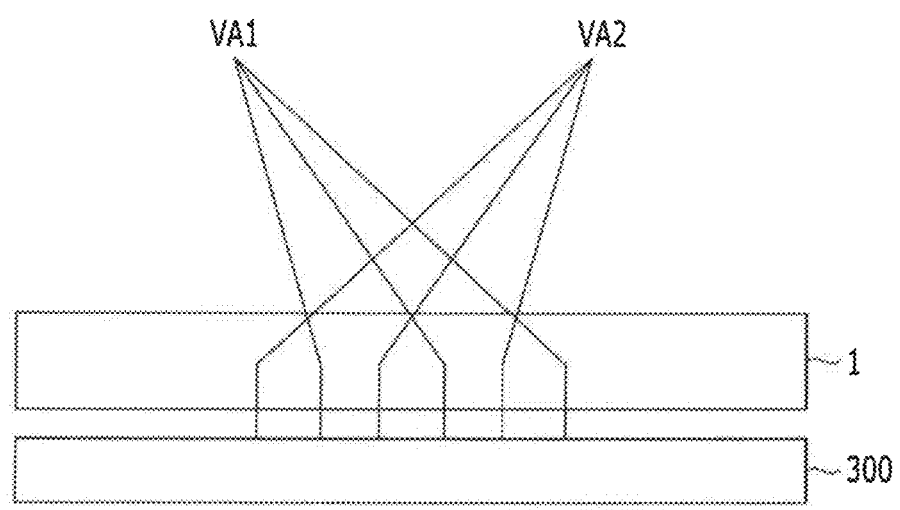

FIGS. 12 and 13 are diagrams illustrating a schematic structure of a 3D image display device including an optical modulation device according to an exemplary embodiment of the present invention and a method of displaying a 2D image and a 3D image, respectively.

Referring to FIGS. 12 and 13, the optical device according to an exemplary embodiment of the present invention may be a 3D image display device. The 3D image display device may include a display panel 300 and an optical modulation device 1 disposed in front of a front surface on which an image of the display panel 300 is displayed. The display panel 300 may include a plurality of pixels displaying an image, and the plurality of pixels may be disposed in a matrix shape.

The display panel 300 may display a 2D image of each frame displayed by the display panel 300 in a 2D mode as illustrated in FIG. 1. The display panel 300 may divide and display images corresponding to various viewpoints such as a right-eye image (e.g. VA1) and a left-eye image (e.g. VA2).

The display panel 300 may divide and display images by a spatial division method in a 3D mode as illustrated in FIG. 13. In the 3D mode, some of the plurality of pixels may display an image corresponding to any one viewpoint, and the other pixels may display images corresponding to other viewpoints. The number of viewpoints may be two or more.

The optical modulation device 1 may include more than one Fresnel lens including the plurality of forward phase slope portions and the plurality of backward phase slope portions to divide images displayed on the display panel 300 for each viewpoint.

The optical modulation device 1 may be switched on and off. When the optical modulation device 1 is switched on, the 3D image display device may operate in the 3D mode, and as illustrated in FIG. 13, the image displayed on the display panel 300 may be refracted to form a plurality of Fresnel lenses which displays the image at the corresponding viewpoint. When the optical modulation device 1 is turned off, as illustrated in FIG. 12, the image displayed on the display panel 300 might not be refracted and the image may be viewed as the 2D image.

While the present invention has been shown and described with reference to the exemplary embodiments thereof, it will be apparent to those of ordinary skill in the art that various changes in form and detail may be made thereto without departing from the spirit and scope of the present invention.

What is claimed is:

1. An optical modulation device, comprising:
   an active area and a peripheral area disposed around the active area;
   a plurality of lower electrodes disposed in the active area, wherein the plurality of lower electrodes extend in a first direction, the plurality of lower electrodes comprise a pair of electrodes including a first lower electrode and a second lower electrode, and wherein the pair of electrodes is repeatedly arranged in a second direction perpendicular to the first direction;
   a driver configured to apply driving signals to the first lower electrode and the second lower electrode;
   a first voltage transfer line connecting the driver and an upper end of the first lower electrode;
   a second voltage transfer line connecting the driver and a lower end of the first lower electrode, the second voltage transfer line opposing the first voltage transfer line with respect to the active area;
   a third voltage transfer line connecting the driver and an upper end of the second lower electrode; and
   a fourth voltage transfer line connecting the driver and a lower end of the second lower electrode, the fourth voltage transfer line opposing the third voltage transfer line with respect to the active area,
   wherein the driver is configured to transfer:
      a first voltage (V1) to the first voltage transfer line;
      a second voltage (V2) to the second voltage transfer line;
      a third voltage (V3) to the third voltage transfer line; and
      a fourth voltage (V4) to the fourth voltage transfer line, and
      wherein V1<V2<V3<V4 or V1>V2>V3>V4 is satisfied.

2. The optical modulation device of claim 1, wherein the first to fourth voltage transfer lines are disposed in the peripheral area, and wherein the first to fourth voltage transfer lines extend in the second direction.

3. The optical modulation device of claim 2, wherein the peripheral area includes an upper peripheral area and a lower peripheral area disposed on opposite sides of the active area,
   wherein the first and third voltage transfer lines are disposed in the upper peripheral area, and
   wherein the second and fourth voltage transfer lines are disposed in the lower peripheral area.

4. The optical modulation device of claim 3, further comprising:
   a first insulating layer disposed between each of the first to fourth voltage transfer lines and between the first and second lower electrodes,
   wherein the first insulating layer includes a plurality of contact holes exposing each of the first to fourth voltage transfer lines, respectively, and
   wherein the first and second lower electrodes are electrically connected with the first to fourth voltage transfer lines through the contact holes.

5. The optical modulation device of claim 4, further comprising:
   an upper electrode facing the first and second lower electrodes; and
   a liquid crystal layer disposed between the first and second lower electrodes and the upper electrode.

6. The optical modulation device of claim 5, wherein the liquid crystal layer includes a plurality of liquid crystal molecules which are aligned to be substantially vertical with respect to a surface of the first and second lower electrodes or the upper electrode.

7. The optical modulation device of claim 1, wherein the driver is configured to apply a driving signal that is gradually decreased or gradually increased in the order of a voltage applied to the upper end of the first lower electrode, a voltage applied to the lower end of the first lower electrode, a voltage applied to the lower end of the second lower electrode, and a voltage applied to the upper end of the second lower electrode.

8. The optical modulation device of claim 7, further comprising:
   a plurality of unit regions disposed in the second direction,
   wherein each unit region of the plurality of unit regions includes at least one of the lower electrodes.

9. The optical modulation device of claim 7, further comprising:
   an upper electrode facing the first and second lower electrodes; and
   a liquid crystal layer disposed between the first and second lower electrodes and the upper electrode,
   wherein the liquid crystal layer includes a plurality of liquid crystal molecules which are aligned to be substantially vertical with respect to a surface of the first and second lower electrodes or the upper electrode.

10. The optical modulation device of claim 1, wherein:
    the driver is configured to apply a driving signal that is gradually decreased or gradually increased in the order of a voltage applied to the lower end of the first lower electrode, a voltage applied to the upper end of the first lower electrode, a voltage applied to the upper end of the second lower electrode, and a voltage applied to the lower end of the second lower electrode.

11. The optical modulation device of claim 10, further comprising:
    a plurality of unit regions disposed in the second direction,
    wherein each unit region of the plurality of unit regions includes at least one of the lower electrodes.

12. The optical modulation device of claim 10, further comprising:
- an upper electrode facing the first and second lower electrodes; and
- a liquid crystal layer disposed between the first and second lower electrodes and the upper electrode,
- wherein the liquid crystal layer includes a plurality of liquid crystal molecules which are aligned to be substantially vertical with respect to a surface of the first and second lower electrodes or the upper electrode.

* * * * *